(12) United States Patent
Borchert et al.

(10) Patent No.: US 9,352,506 B2
(45) Date of Patent: May 31, 2016

(54) METHOD FOR PRODUCING HOLLOW BODIES FROM THERMOPLASTIC MATERIAL AND DEVICE FOR CARRYING OUT THE METHOD

(71) Applicant: Kautex Textron GmbH & Co. KG, Bonn (DE)

(72) Inventors: Matthias Borchert, Bonn (DE); Carsten Elsasser, Pulheim (DE); Christoph Mehren, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 173 days.

(21) Appl. No.: 14/099,008

(22) Filed: Dec. 6, 2013

(65) Prior Publication Data
US 2014/0178522 A1 Jun. 26, 2014

Related U.S. Application Data

(62) Division of application No. 13/168,935, filed on Jun. 24, 2011, now Pat. No. 8,603,280.

(60) Provisional application No. 61/363,756, filed on Jul. 13, 2010.

(30) Foreign Application Priority Data

Jun. 24, 2010 (DE) .......................... 10 2010 025 006

(51) Int. Cl.
| | | |
|---|---|---|
| B29C 49/00 | (2006.01) | |
| B29C 49/42 | (2006.01) | |
| B29C 51/12 | (2006.01) | |
| B29C 51/26 | (2006.01) | |
| B29L 31/00 | (2006.01) | |

(52) U.S. Cl.
CPC ......... *B29C 49/0047* (2013.01); *B29C 49/4205* (2013.01); *B29C 51/12* (2013.01); *B29C 51/267* (2013.01); *B29L 2031/7172* (2013.01)

(58) Field of Classification Search
CPC ................... B29C 49/0047; B29C 2049/0063; B29C 49/4205; B29C 51/12; B29C 51/267; B29L 2031/7172
See application file for complete search history.

(56) References Cited

U.S. PATENT DOCUMENTS

| | | |
|---|---|---|
| 5,326,514 A | 7/1994 | Linden et al. |
| 6,866,812 B2 | 3/2005 | Van Schaftingen et al. |
| (Continued) | | |

FOREIGN PATENT DOCUMENTS

| | | | |
|---|---|---|---|
| CA | 2654106 | 1/2008 | |
| CN | 101633240 A * | 1/2010 | ............ B29C 51/267 |

(Continued)

OTHER PUBLICATIONS

Letter and enclosed Third Party Observation dated Jul. 16, 2012, received from Morris, Manning & Martin, LLP, 12 pgs.

(Continued)

*Primary Examiner* — Robert B Davis
(74) *Attorney, Agent, or Firm* — Grossman Tucker Perreault & Pfleger, PLLC

(57) ABSTRACT

The invention relates to a method for producing hollow bodies from thermoplastic material, comprising the molding of at least two sheet-like, web-shaped preforms of plasticated thermoplastic material in a multi-part tool forming a cavity to form two complementary shells, and also the joining together of the shells to form a substantially closed hollow body, wherein the preforms are brought between open parts of the tool which each have part-cavities, the parts of the tool are then closed against a tool separator arranged between the preforms, and the preforms are inserted into the part-cavities with the use of differential pressure and molded. In a subsequent separate method step, the tools are reopened and internal components of the hollow body to be produced are fastened to the shells. Finally, the shells are joined together by reclosing the tools to form a closed hollow body.

16 Claims, 11 Drawing Sheets

(56) References Cited

U.S. PATENT DOCUMENTS

Figure 1:
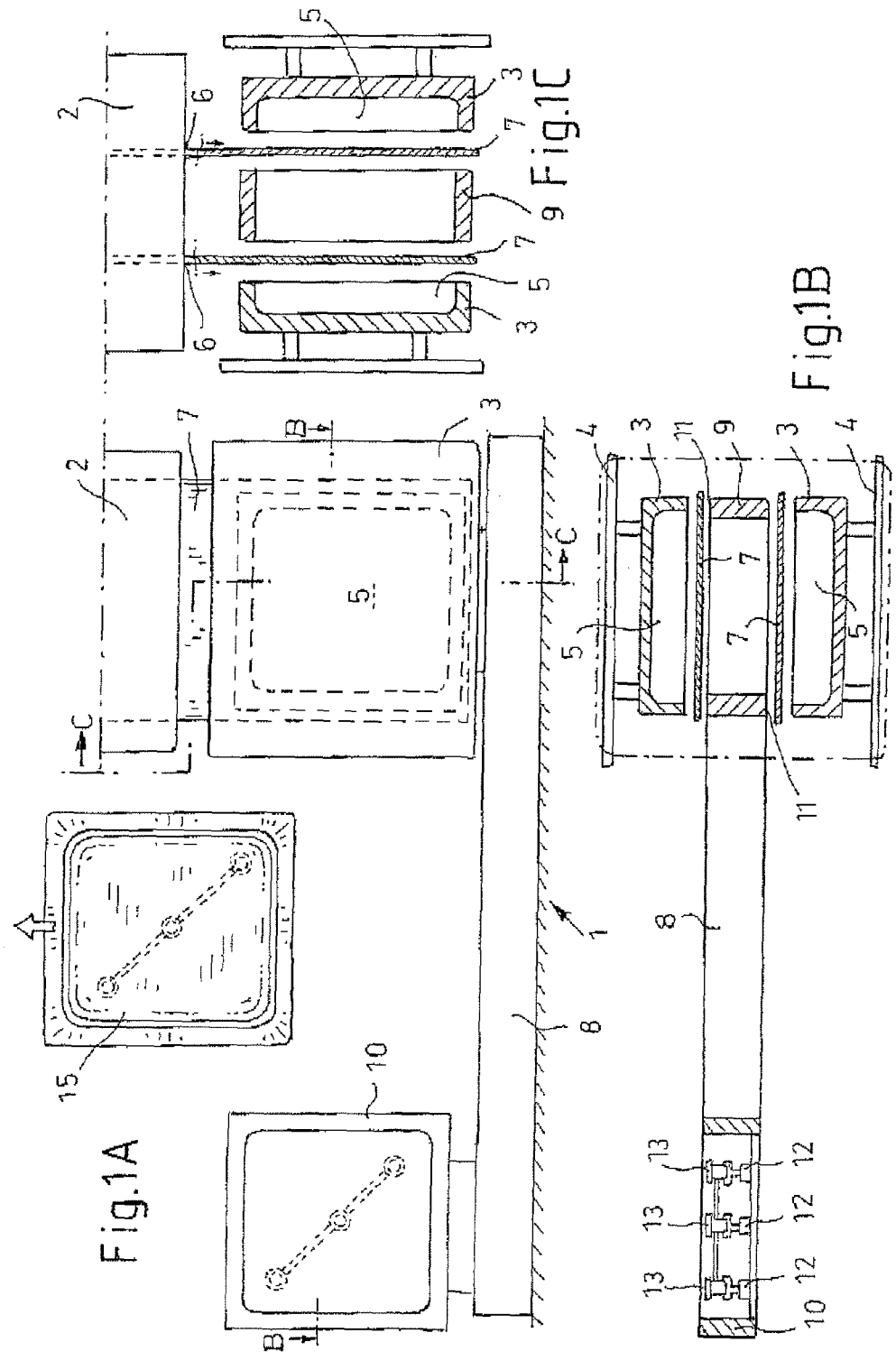

| | | |
|---|---|---|
| 2006/0141184 A1 | 6/2006 | Rohde et al. |
| 2008/0078761 A1* | 4/2008 | Borchert ............ B65D 90/0006 220/4.13 |
| 2008/0164639 A1 | 7/2008 | Criel et al. |
| 2009/0026664 A1 | 1/2009 | Criel et al. |
| 2009/0047375 A1 | 2/2009 | Borchert |
| 2009/0102102 A1 | 4/2009 | Borchert et al. |
| 2012/0139168 A1 | 6/2012 | Sun et al. |

FOREIGN PATENT DOCUMENTS

| | | |
|---|---|---|
| CN | 101733933 | 6/2010 |
| DE | 10231866 | 1/2004 |
| DE | 102006006469 | 8/2007 |
| DE | 102006027256 | 12/2007 |
| DE | 102006042065 | 3/2008 |
| EP | 2468477 | 6/2012 |
| JP | 0699474 | 4/1994 |
| WO | 2004/007182 | 1/2004 |
| WO | 2011/020223 | 2/2011 |

OTHER PUBLICATIONS

EP Search Report dated Jan. 7, 2013, received in corresponding EP Application No. 11005018.4-2399722, 5 pgs.

EP Search Report dated Mar. 7, 2014, received in corresponding EP Application No. 11005018.4, 12 pgs.

* cited by examiner

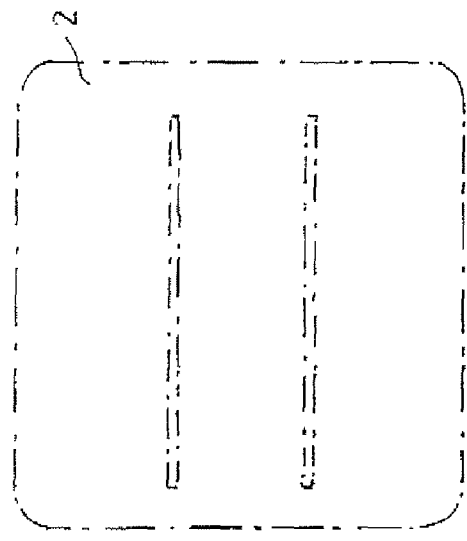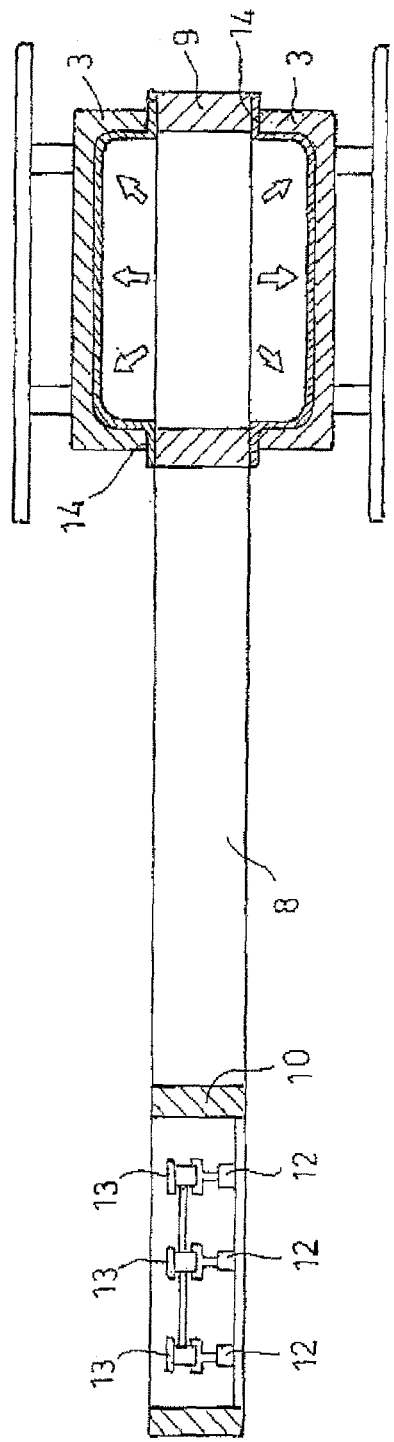
Fig. 3

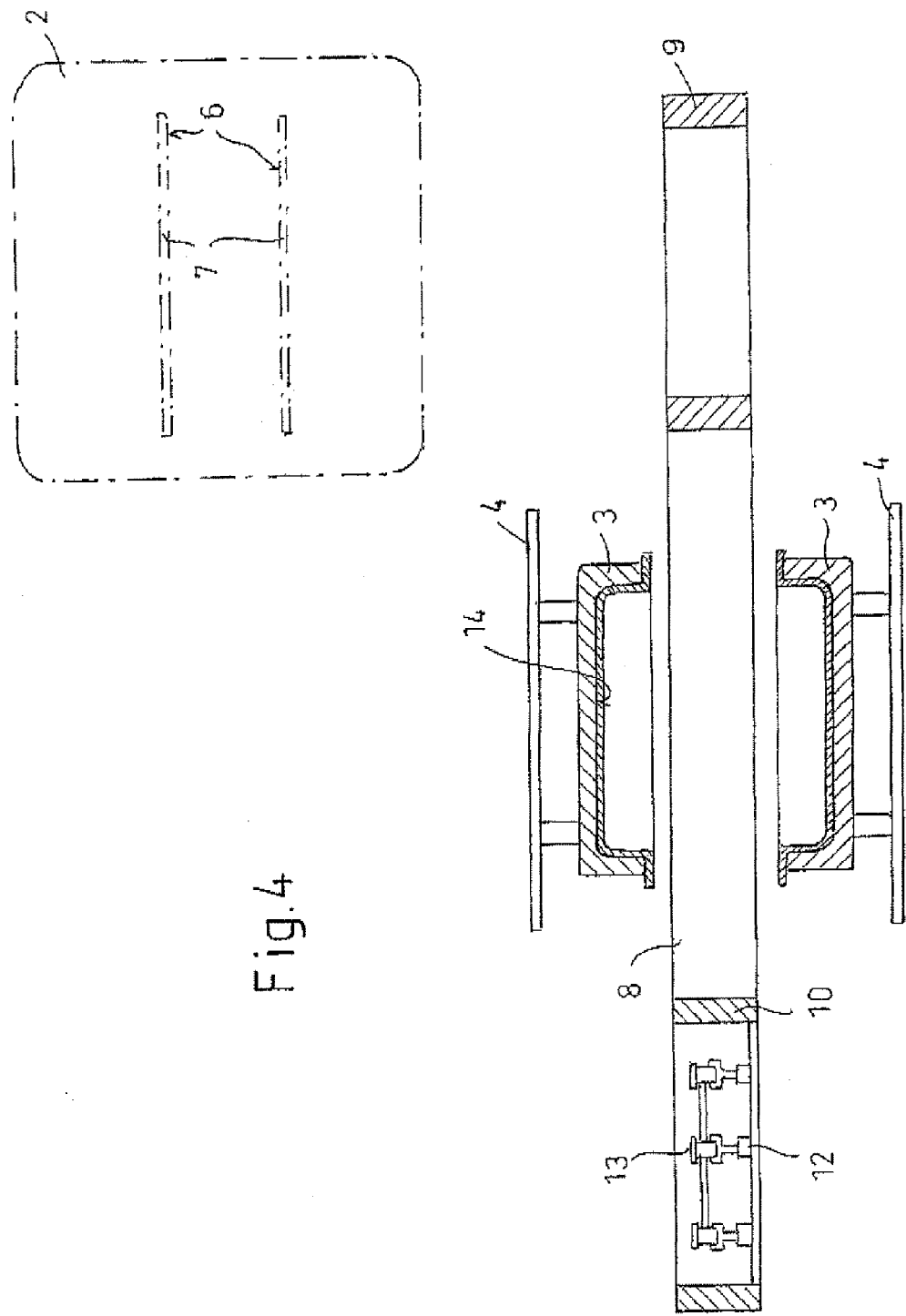

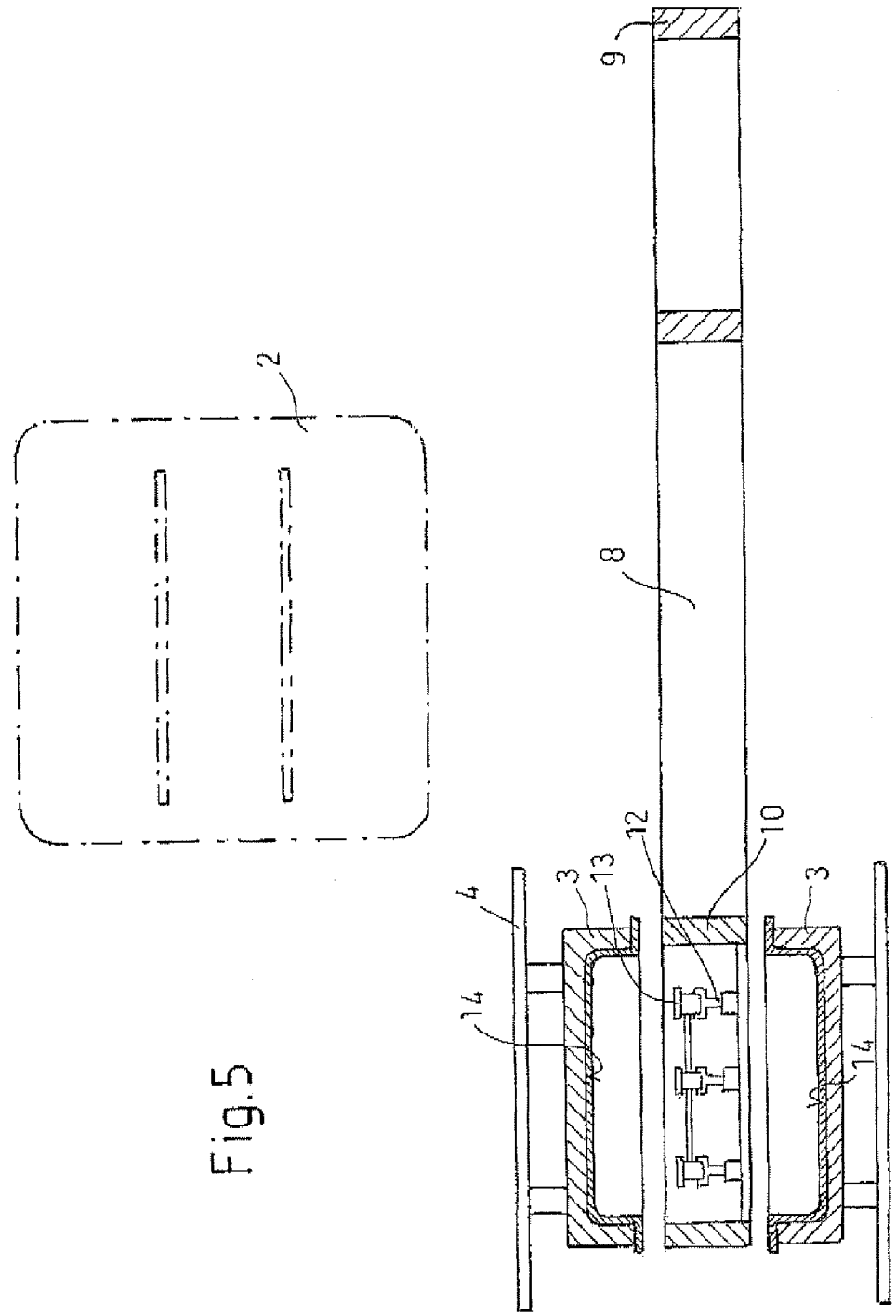

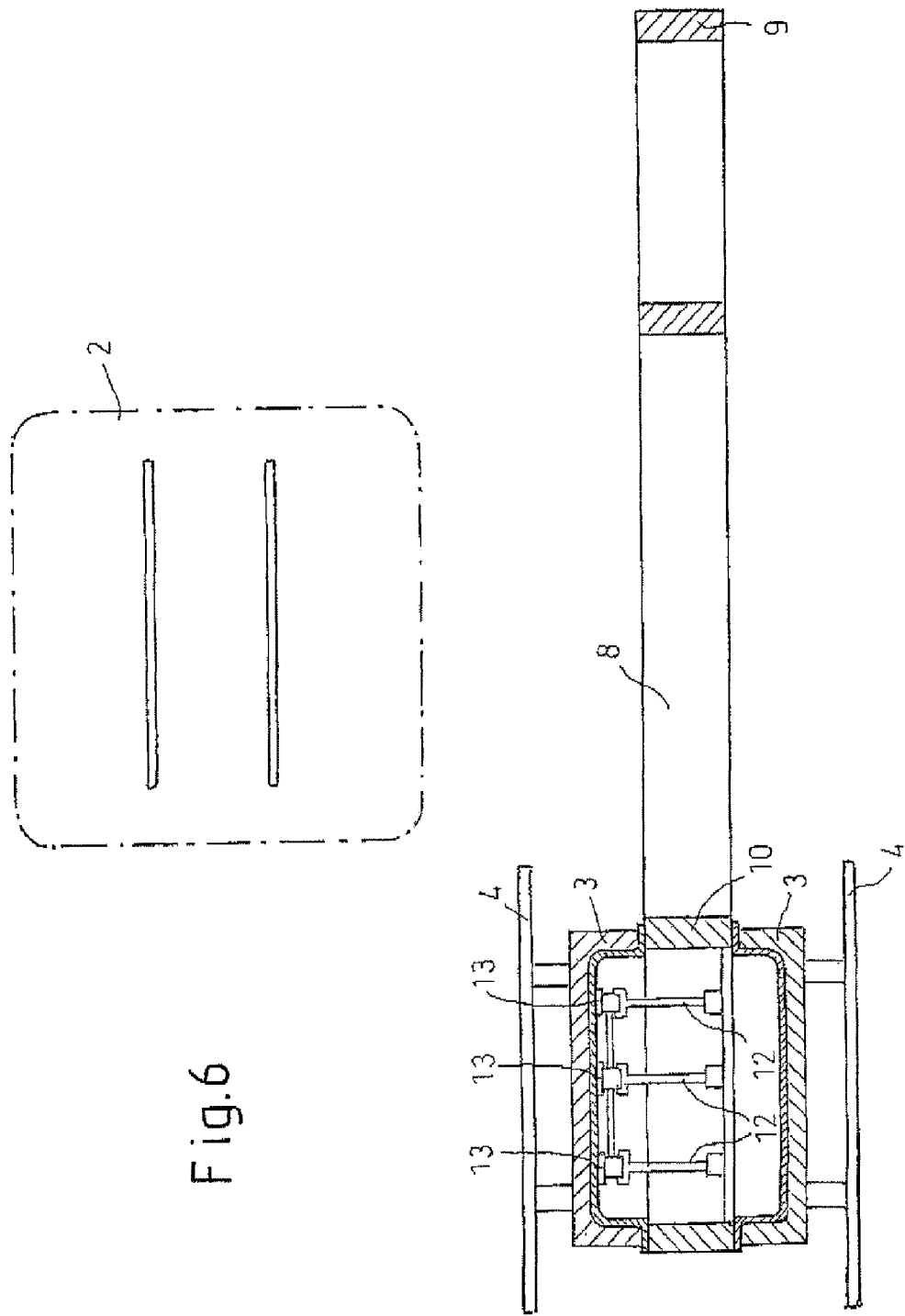

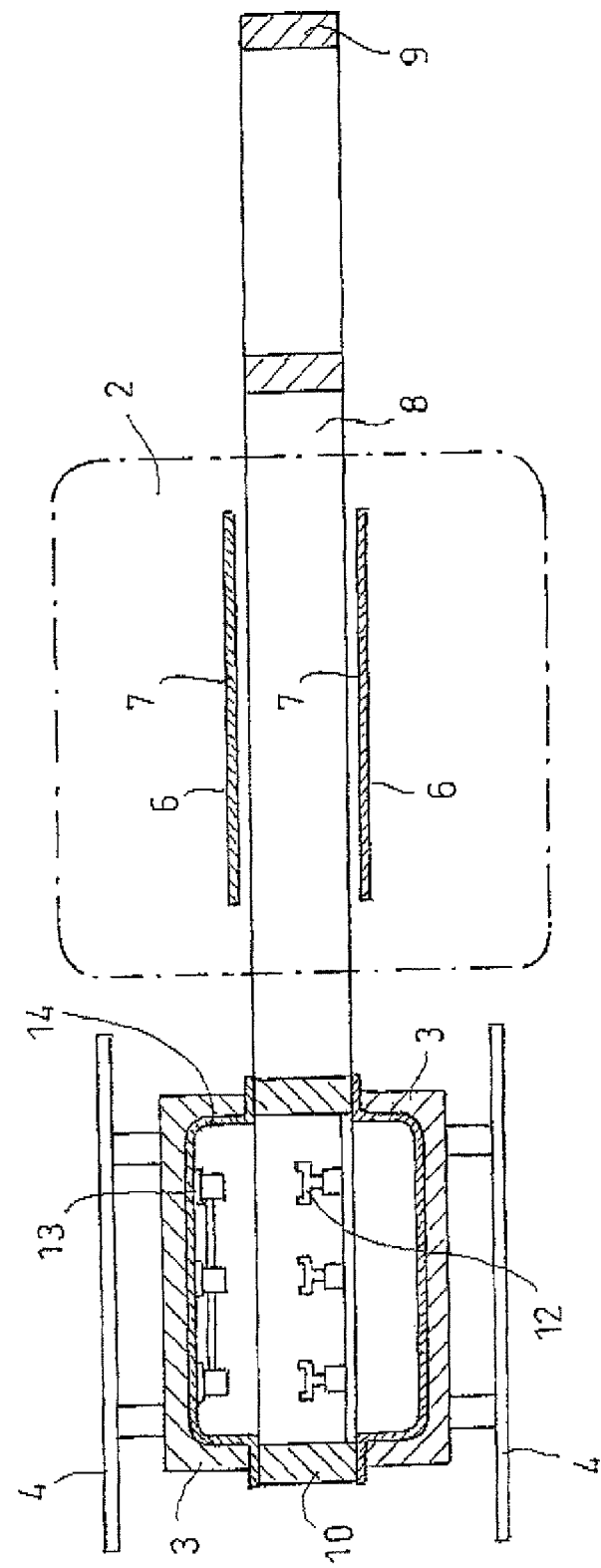

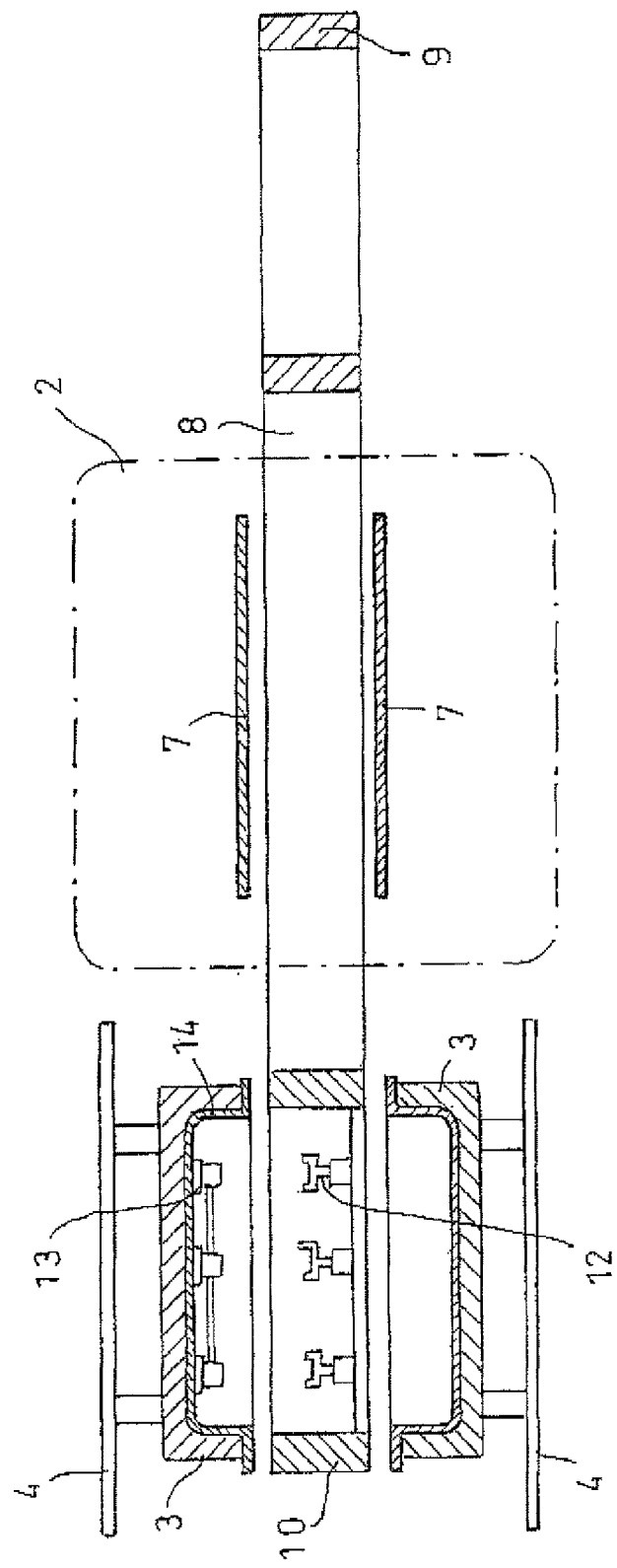

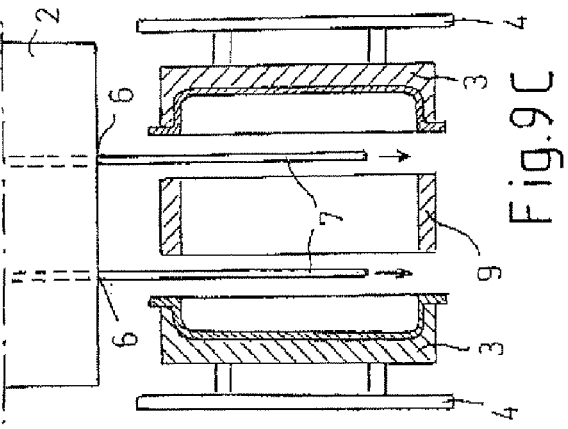
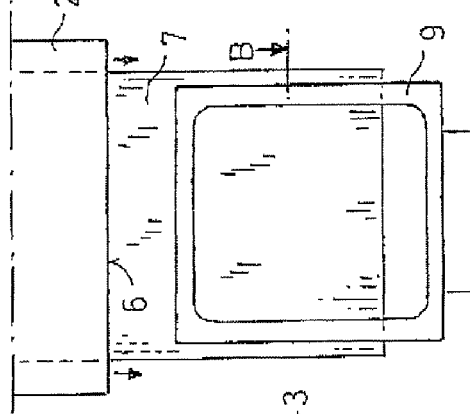
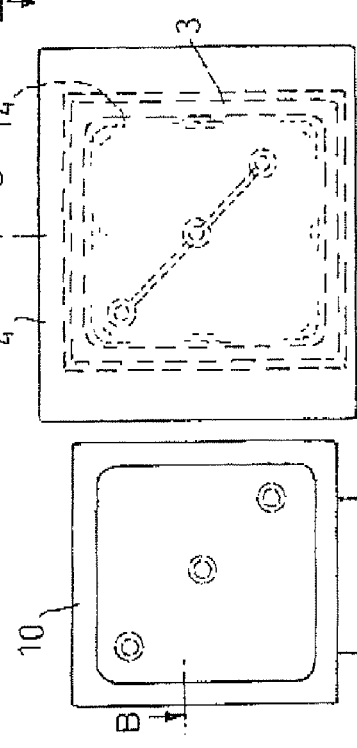
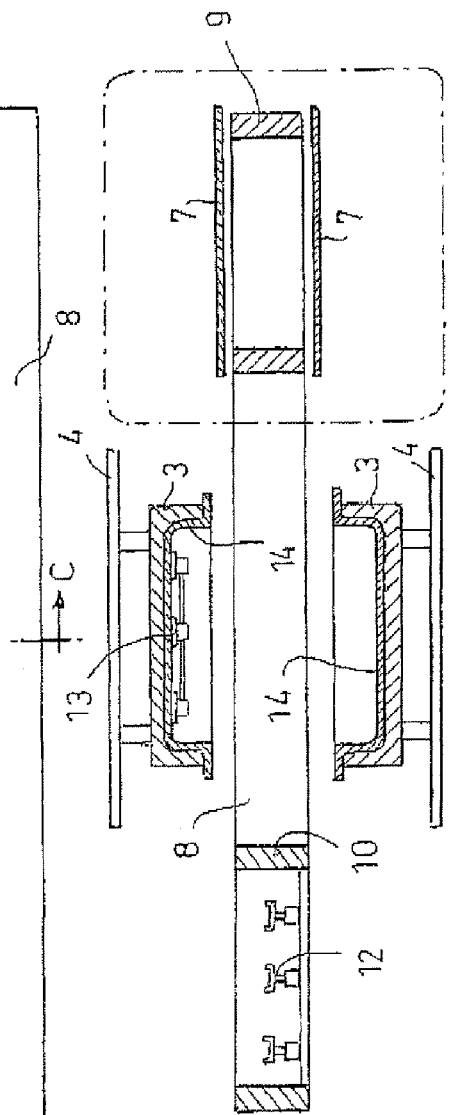
Fig.9A  Fig.9B  Fig.9C

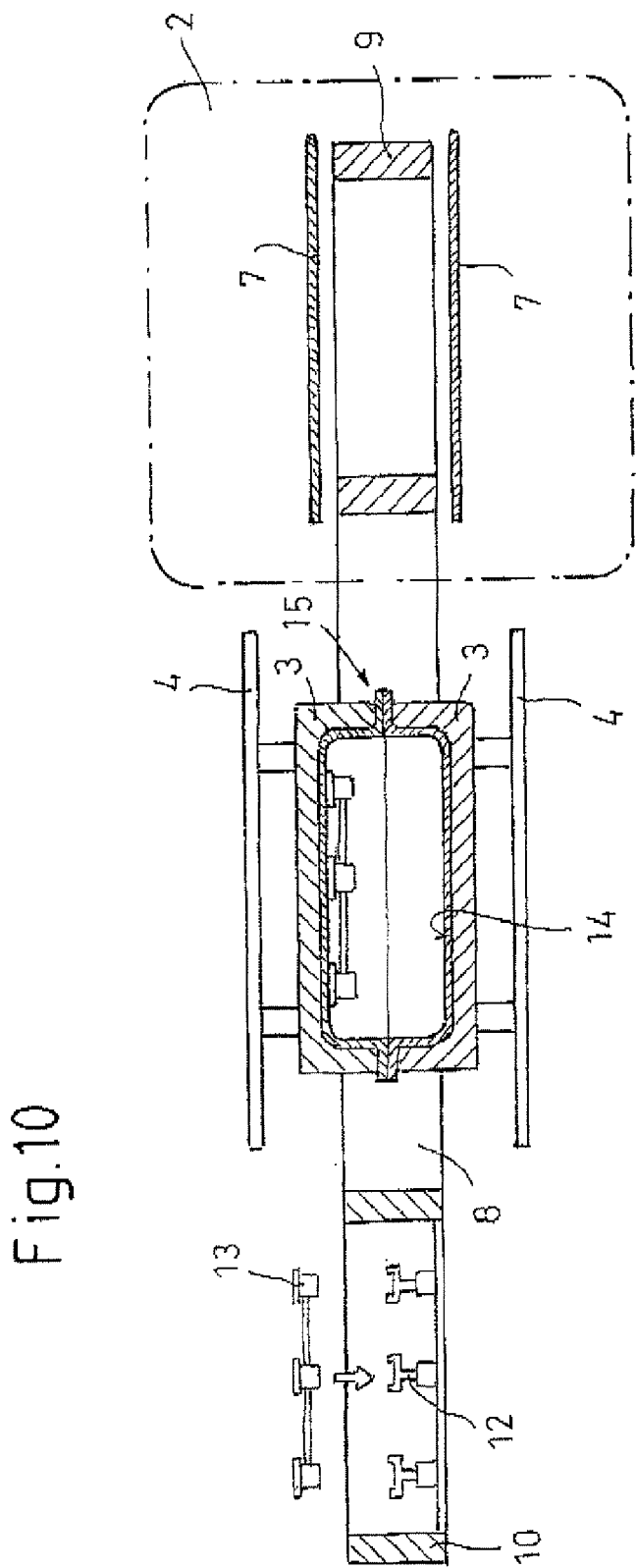

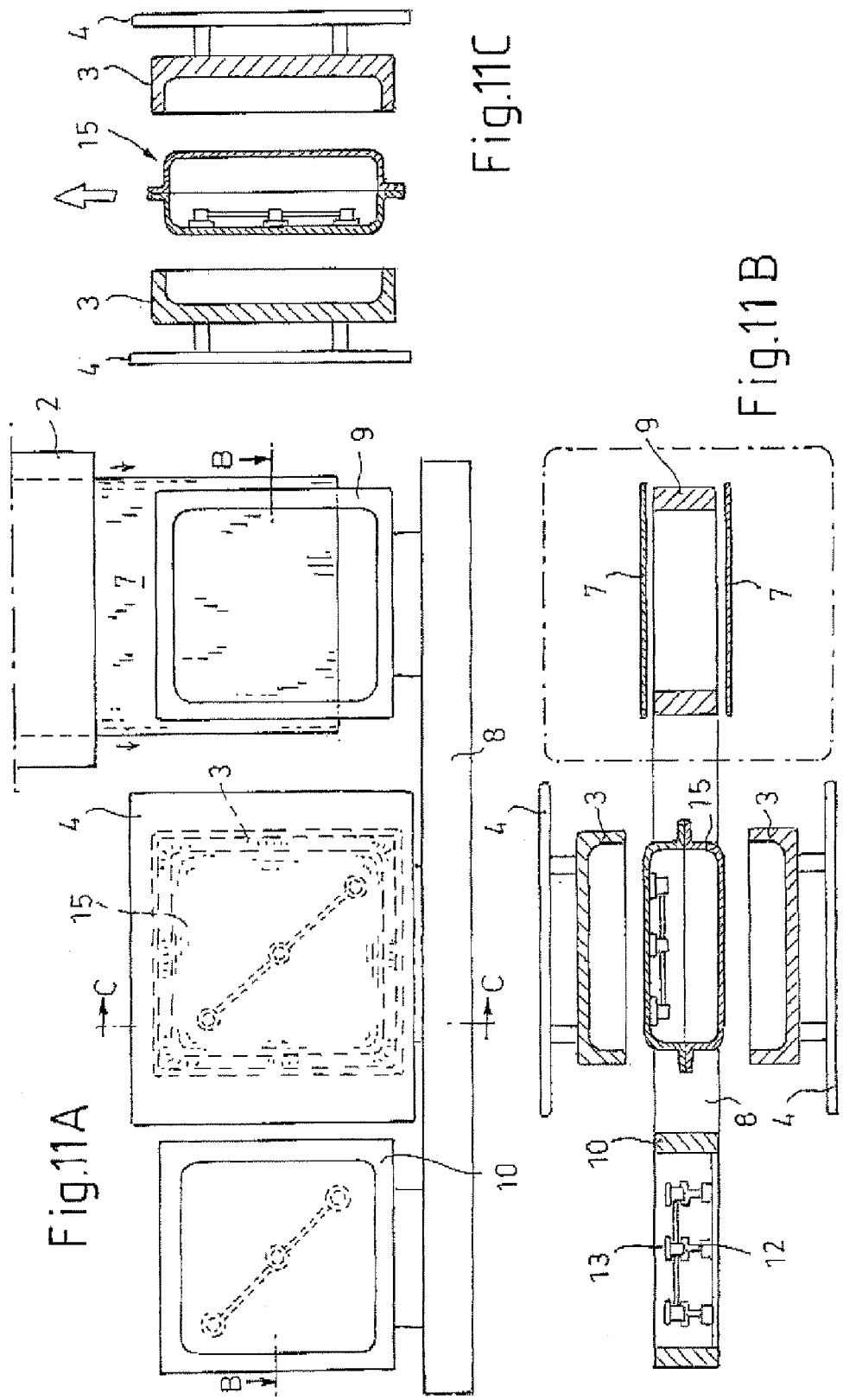

METHOD FOR PRODUCING HOLLOW BODIES FROM THERMOPLASTIC MATERIAL AND DEVICE FOR CARRYING OUT THE METHOD

CROSS-REFERENCE TO RELATED APPLICATIONS

This application is a divisional application of U.S. application Ser. No. 13/168,935, filed Jun. 24, 2011, now pending, which claims priority to German application serial no. DE 10 2010 025 006.6 filed Jun. 24, 2010 and the benefit of U.S. provisional application no. 61/363,756 filed Jul. 13, 2010.

The invention relates to a method for producing hollow bodies from thermoplastic material, comprising the molding of at least two sheet-like, web-shaped preforms of plasticated thermoplastic material, and also to a device for carrying out the method.

The invention relates in particular to a method for producing hollow bodies from thermoplastic material by extrusion blow molding.

In the extrusion blow molding of plastic products, molding tools which comprise two mold halves which are formed to complement one another and together delimit a mold cavity or a cavity are usually used. A thermoplastic extrudate, usually in the form of a parison, is brought between the open halves of the tool. The tool closes around the preform, the latter is made to lie within the tool against the inner wall of the cavity formed by the tool, and so the finished article has an outer shape which corresponds to the inner contour of the molding tool. The preform is re-formed within the cavity of the tool either by expansion of the preform by means of gas pressure or by making the preform lie against the inner wall of the tool by means of negative pressure, which is applied by way of channels in the wall of the mold.

In particular in the production of technical components, such as fuel tanks, which are produced in one piece from thermoplastic material, it is necessary to fasten various internal components in the hollow body. For a wide variety of reasons, it is necessary and expedient to introduce the internal components into the hollow body as early as during the production of the latter. In the production of hollow bodies using conventional extrusion blow molding, in which an extrudate in the form of a closed parison is brought between the open halves of the tool and the parison is expanded within the closed tool to form the finished hollow body, the internal components can be introduced, for example, by so-called "encapsulation by blow molding" during the production. In this method, the components to be introduced are inserted into the parison by means of an appropriately designed holding device before the parison is expanded within the closed tool, and are fastened to the wall of the cavity possibly with the aid of further movable components within the tool when the preform is made to lie against said wall. These methods are very complicated and are limited to a relatively great extent, particularly with regard to the subsequent position and number of the internal components in the finished tank. In the production of fuel tanks by the extrusion blow molding of tubular extrudates, it is therefore still necessary to fasten certain internal components in the tank after it has been finished. The wall of the tank may need to be damaged for this purpose.

It is often necessary, for example in order to fasten venting valves, safety valves and the like, to provide circular cutouts or apertures in the wall of the tank, in order to make it possible to securely fix said valves at a suitable position on the wall of the tank.

It is known that the thermoplastic materials used for the production of fuel tanks are not completely resistant to hydrocarbons, and so the wall of the tank has to be designed as a multilayered extrudate with barrier layers for hydrocarbons. Alternatively, it is possible to subject the inner wall of the tank to chemical treatments, for example fluorination or sulfonation. Any damage to the wall of the tank resulting from the production of holes, circular cutouts or the like is undesirable owing to the required permeation resistance for fuel tanks, since complicated sealing of openings of this type is subsequently necessary.

Particularly against the background of the above-described problem relating to the introduction of internal components and functional components into fuel tanks for motor vehicles, methods which have proved to be particularly suitable for producing fuel tanks of this type are those in which at least two sheet-like, web-shaped preforms of plasticated thermoplastic material are re-formed in a multi-part tool forming a mold cavity with two outer molds and at least one central mold, which perform an opening and closing movement in relation to one another, wherein internal components are fastened via the central mold or the core to the inner wall of the hollow body to be produced. For this purpose, the tools are initially closed around the core. Internal components are fastened to the preform in a predefined layout by means of the core, the core is removed between the mold halves, the mold halves are then closed again and the fuel tank is blow-molded to the final shape. A method of this type is known, for example, from WO 2007/088200 A1. A further comparable method is known, for example, from EP 1 773 570 B1. Finally, a method of this type is known, for example, from U.S. Pat. No. 6,866,812 B2.

The methods described above provide the particular advantage that, in the case of relatively complex structures of the tank to be produced, internal components can be fitted, in the interior of the tank to be produced, on the wall of the tank at virtually any desired location thereof in any desired layout, without it being necessary to damage the wall of the tank in terms of a piercing, aperture or circular cutout.

For a wide variety of reasons, it is advantageous when employing such methods to draw on the existing extrusion technology which is also used for the conventional extrusion blow molding from the parison. This is particularly advantageous because it is possible to draw on existing extruders and extrusion die heads, and because there are relatively simple ways to control the radial and axial wall thickness of the extrudates. This is particularly expedient for the co-extrusion of multilayered preforms with relatively complex melt control in the extrusion die heads.

For this reason, it is proposed in U.S. Pat. No. 6,866,812 B2, for example, to split or separate an extruded tubular preform at diametrically opposite locations to form web-shaped, sheet-like preforms, and to bring these web-shaped preforms between the open parts of the tool, to be precise by continuous extrusion in the gravitational direction above the tool.

Depending on the position and arrangement of the internal components to be introduced into the tank, the core used for this purpose has to have a relatively high structural depth, which ultimately predefines the minimum distance between the web-shaped preforms which are to be moved apart. For this reason, it is necessary, as is likewise described in U.S. Pat. No. 6,866,812 B2, to move the preforms by means of complex roller conveyors and to keep them at a distance from one another between the open parts of the tool.

In addition, the core or the central tool has a relatively complex design. Specifically, it has to be designed such as to also make it possible to reliably seal the cavity of the tool in addition to the possibly hydraulically or pneumatically retractable and extendable component holders, heating devices, stamping dies or the like. Finally, the central tool has to withstand the entire closing pressure of the tool, since generally in a first step, when re-forming and molding the preforms to form half-shells, a blowing pressure of at least 5 bar has to be applied. As a result, the required central tool is relatively expensive, not least because it has to be designed completely to tool quality.

The invention is therefore based on the object of providing a method for producing hollow bodies, in particular fuel tanks, of thermoplastic material from sheet-like, web-shaped preforms, which avoids the disadvantages mentioned above. In particular, the method should be easier to carry out and require less investment in the devices to be provided for this purpose.

The object is firstly achieved by a method for producing hollow bodies from thermoplastic material, comprising the molding of at least two sheet-like, web-shaped preforms of plasticated thermoplastic material in a multi-part tool forming a cavity to form two complementary shells, and also the joining together of the shells to form a substantially closed hollow body, wherein the preforms are brought between open parts of the tool which each have part-cavities, the parts of the tool are then closed against a tool separator arranged between the preforms, and the preforms are inserted into the part-cavities with the use of differential pressure and molded, in a further separate method step the tools are reopened and internal components of the hollow body to be produced are fastened to the shells, and finally the shells are joined together by reclosing the tools to form a closed hollow body.

Within the context of the invention, closing is not necessarily understood to mean closing with the application of significant closing forces, at least in the case of initial closing. Rather, it suffices in this context to move the tools such as to seal the cavities, which makes it possible for the preforms to be molded to form shells.

The web-shaped preforms can be provided according to the invention both by separating a previously extruded parison at diametrically opposite locations and by extruding web-shaped preforms from slot dies spaced apart from one another. For this purpose, an extrusion die head as per DE 10 2006 042 065 A1 can be used, for example, this document hereby being fully incorporated by reference, also for the purpose of disclosure.

Suitable extrudates are preferably co-extrudates of thermoplastic material with barrier layers for hydrocarbons. In the context of the invention, however, it is also possible to process web-shaped preforms from single-layered extrudates. It is preferable to extrude the web-shaped preforms on the basis of HDPE. By way of example, six-layered co-extrudates with HDPE as the base material and with EVOH as the barrier material are suitable.

In a further preferred refinement, the method comprises the continuous extrusion of at least two sheet-like, web-shaped preforms in the gravitational direction above the open parts of the used tool.

The invention can be summarized by stating that, according to the method according to the invention, the method steps of re-forming and molding the preforms to form shell-shaped elements and the joining of internal components to the inner wall of the shells thus produced are carried out in two separate method steps, and are functionally separated from one another in terms of tools. For the molding of the shells using differential pressure within the cavity of the tool, it is thus merely necessary to seal the cavity of the tool in such a manner that the complementary shells do not fuse together.

Within the context of the present invention, complementary is to be understood as meaning at least two shell-shaped components which are formed in each case to fit together in a manner such as to provide the finished hollow body when they are joined together or combined.

The method according to the invention has the particular advantage that merely a simple tool separator is required to mold the shells, and this tool separator has to fulfill only one sealing function. The structural depth of the tool separator can be independent of the position and arrangement of the internal components to be introduced into the hollow body, and so it is no longer necessary to guide sheet-like or web-shaped preforms extruded above the tools in the gravitational direction. These can be extruded at the distance apart which is predefined by the extrusion die head, without having to be kept at a distance from one another or guided, in particular by the use of roller conveyors, manipulators, grippers, heated rods or the like. This is particularly advantageous when using an extrusion die head, as described in DE 10 2006 042 065 A1, in which a tubular melt stream of the co-extrudate is split, by the appropriate formation of flow channels within the extrusion die head, into two substantially sheet-like, web-shaped planar melt streams.

The method has the further advantage that the internal components to be introduced into the hollow body or into the fuel tank can be manipulated when the tool is open.

By way of example, the internal components can be introduced by means of conventional 3D manipulators, which can be positioned at an appropriate location of the blow molding machine.

The preforms can be introduced into and molded in the part-cavities of the parts of the tool either by the application of excess pressure and/or by the application of negative pressure over the tools. For this purpose, negative pressure channels or negative pressure openings, for example in the form of porous regions, can be provided in the tools.

In a preferred variant of the method according to the invention, it is provided that the internal components are fastened to the shells by means of a component carrier which can be brought between the open parts of the tool.

The shells are preferably molded using the first heat of the extrudate, i.e. using the plastication heat from the extrusion.

In a particularly preferred variant of the method according to the invention, it is provided that the internal components are fastened to the shells using the first heat of the extrudate, i.e. that the internal components are brought or joined to the inner wall of the shells, i.e. that wall which faces away from the wall of the mold, when the shells are still in the molten state. By way of example, the internal components can be riveted or welded to the shells when the latter are in this state, possibly with the aid of additional welding energy by means of IR radiators or with the aid of welding mirrors.

In a further expedient variant of the method according to the invention, the introduction of additional thermal energy into the shells can be provided in the sense of intermediate heating immediately after the shells have been molded and before internal components are introduced. The temperature of the still hot-plastic material of the shells can additionally be controlled in this manner, for example, by means of radiated heat or the application of hot air (convective heat transfer).

Leadthroughs can also be provided in the wall of the shells for the introduction of interfaces during the molding of the shells or immediately after the shells have been molded and before the internal components are introduced. Interfaces of this type in the form of fittings to be led through the wall of the shells can then be introduced into the shells in the next method step, in which the joining of the internal components takes place.

In one variant of the method according to the invention, it is provided that the internal components are arranged on the component carrier in the intended installation position in relation to one another and/or on the shells, i.e. that these are already arranged on the component carrier in accordance with the later layout on the walls of the tank.

The joining of the internal components can take place, for example, by means of stamping dies which are retractable and extendable from the plane of the component carrier. This can alternatively be carried out by means of a component carrier frame which is retractable and extendable from a central frame.

In one variant of the method according to the invention, it is provided that the internal components are fastened to the shells using a closing movement of the tools. This means that the internal components are arranged statically on the component carrier, and the closing movement or the stroke movement of the tools in the direction of the component carrier is used for the joining of the internal components.

Within the context of the invention, it can be provided that the cavities are also sealed when the parts of the tool are being closed against the component carrier, in order possibly to bring about further application of blowing pressure and/or flushing of the cavity of the tool.

In an expedient refinement of the method according to the invention, it is provided that the tool separator used is a central frame or a central plate, which absorbs the closing force when the tools are being closed and brings about circumferential sealing of the cavity.

It is particularly expedient if the temperature of the tool separator and/or parts of the tool is controlled, in order to prevent premature cooling of the flanges of the shells to be fused together or in order to prevent excessive heating of the flanges and bonding of the flanges to the tool separator, and in order to ensure that the shells can still be fused together.

If the tool separator is in the form of a central frame/sealing frame, it is possible for heating devices for the intermediate heating/intermediate temperature control of the molded shells to be provided within the frame. Suitable heating devices are, for example, infrared radiators or hot-air blowers. Optionally, it is possible to provide additional functional units, for example in order to pierce the wall of the shells in order to produce interfaces to the outside of the tank, in the tool separator in the form of a central frame/sealing frame.

If the tool separator is in the form of a central frame/sealing frame, it can be provided, for example, with removable profiled top pieces, which are formed in each case with a spatially curved profile of the sealing edge according to the profile of the later joins of the shells of the fuel tank. As a result, it is possible to provide a standardized tool separator for different tools with different cavities which, depending on the product to be produced, is equipped with customer-specific, mountable profiled top pieces.

In one variant of the method according to the invention, the component carrier provided is a core, around which the parts of the tool can close in order to join the internal components to the shells in a predefined layout. The component carrier used is preferably a central frame, against which the parts of the tool can be closed.

If the component carrier used is a central frame, this central frame can in principle be in the form of an open, i.e. laterally accessible, frame. If the component carrier has an open design, significantly less expensive joining cylinders and a significantly less expensive sensor system can be used, since these no longer have to be temperature- and pressure-resistant.

The object on which the invention is based is also achieved by a device for carrying out the method, said device comprising a multi-part blow molding tool having at least two mold halves, which each form part-cavities with a contour that corresponds to the contour of the shells to be molded, and having at least one tool separator which can be moved transversely to an opening and closing movement of the mold halves, wherein the tool separator is in the form of a central frame or central plate, which is designed exclusively to absorb the closing force of the mold halves and to seal the cavity of the blow molding tool. Within the context of the above statements, exclusively means that the tool separator has no means for receiving and fastening internal components in the hollow body to be produced or on the shells.

In an advantageous refinement of the device according to the invention, provision is made of at least one component carrier, which can be moved transversely to the opening and closing movement of the blow mold halves.

The component carrier and the tool separator can be arranged on a common machine frame.

By way of example, they can be arranged on the machine frame at a fixed distance from one another, wherein the machine frame can be moved in relation to, and transversely to the opening and closing movement of, the blow mold halves.

Alternatively and also in addition, it can be provided that the component carrier and the tool separator are arranged on the machine frame such that they can move in relation to one another.

Figure 2:
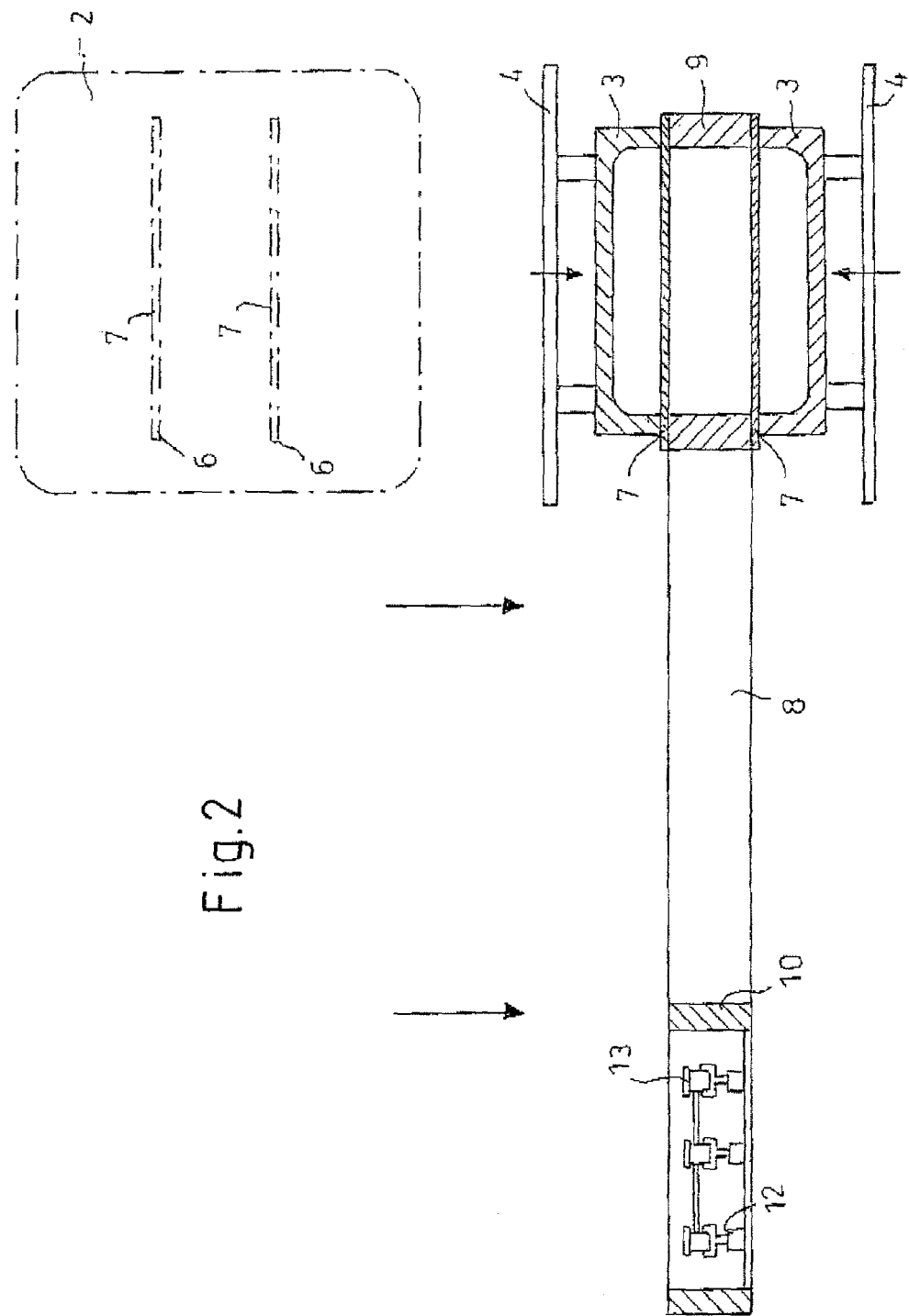

The method according to the invention will be explained below, with reference to the appended drawings, on the basis of an exemplary embodiment:

FIG. 1a shows a schematic illustration of a device according to the invention at the start and at the end of a production cycle, FIG. 1b shows a plan view of the arrangement shown in FIG. 1a, FIG. 1c shows a partial section along lines C-C in FIG. 1, FIG. 2 shows a view corresponding to FIG. 1b, in which the tools are closed against a tool separator arranged between the preforms, FIG. 3 shows the molding of the preforms to form shells, FIG. 4 shows a plan view of the open tools after the shells have been molded, FIG. 5 shows a view of the open tools immediately before the internal components are introduced, FIG. 6 shows a plan view of the closed tools during the introduction of the internal components, FIG. 7 shows a plan view of the closed tools after the internal components have been introduced, FIG. 8 shows a plan view of the open tools after the internal components have been introduced, FIGS. 9a-9c show views, which correspond to FIGS. 1a-1c, immediately before the tools are closed in order to join the shells together to form a finished article, FIG. 10 shows a plan view of the closed tools with the finished article, FIG. 11a-11c show views which correspond to FIGS. 1a-1c and illustrate the removal of the finished article.

Reference is firstly made to FIGS. 1a-1b, which show a schematic view of a blow molding tool 1 and of an extrusion die head 2 for carrying out the method according to the invention. The blow molding tool 1 comprises two blow mold halves 3, which are fastened to platens 4 in a known manner and can be moved away from one another and toward one another in the sense of an opening and closing movement. Although the term "blow mold halves" has been used above, it is within the scope of the invention if the individual tool parts which each form part-cavities 5 have a multi-part design. Each of the blow mold halves 3 does not necessarily have to form half of the tool or of the mold cavity/of the cavity. The parting plane of the blow mold halves 3 also does not necessarily have to geometrically form half the partition of the tool.

The platens 4 are part of a basic machine frame (not shown in more detail) which can be moved in relation to the stationary extrusion die head 2, as shown in the drawings.

In the drawings, the extrusion die head 2 is shown in greatly simplified form. It comprises two slot dies 6, from each of which sheet-like or web-shaped preforms 7 extending in a straight line into the plane of the drawing are extruded continuously in a suspended manner, i.e. in the gravitational direction. The preforms 7 preferably each consist of an extrudate having a total of six layers, comprising an outer HDPE layer dyed in carbon black, a recyclate (regrind) layer based on HDPE, an EVOH barrier layer surrounded on both sides by bonding agent, and also a further, undyed HDPE layer. The layers of bonding agent can be based on LDPE, for example.

In addition to the basic machine frame (not shown), the blow molding tool 1 according to the invention comprises a machine frame 8, which can be moved in relation to the basic machine frame and transversely to the opening and closing movement of the platens 4. A tool separator 9 and a component carrier 10 are arranged on the machine frame 8 at a distance from one another.

The tool separator 9 is substantially in the form of a sealing frame, the peripheral sealing surfaces 11 of which define a peripheral contour which approximately follows the delimitation of the part-cavities 5 of the blow mold halves 3.

The component carrier 10 is likewise in the form of a central frame, within which there are individual component holders 12 in the form of pneumatic piston-cylinder arrangements with fastening means.

In the drawing, the structural depth of the tool separator 9 and of the component carrier or central frame 11 is shown to be approximately equal, specifically for reasons of simplicity. In actual fact, the structural depth of the tool separator 9 is lower than that of the component carrier 10. In the simplest case, the tool separator 9 can be in the form of a simple plate, possibly with means for applying blowing pressure to the cavity.

The distance between the component carrier 10 and the tool separator 9 on the machine frame 8 corresponds approximately to (greater than or equal to) the width of the clamping frame or of the platens 4.

As has already been mentioned, the component carrier 10 and the tool separator 9 can also be arranged on the machine frame such that they can move in relation to one another. In this case, the movement path has to be greater than or equal to the width of the platens 4.

FIG. 1a-1b show the blow molding tool 1 at the end and at the start of each working cycle. A working cycle of this type comprises firstly the continuous extrusion of the preforms 7 to a length which corresponds approximately to the height of the blow mold halves 3, as shown in FIG. 1c. The preforms 7 are extruded between the open blow mold halves 3, specifically in each case between a blow mold half 3 and the tool separator 9 arranged between the blow mold halves 3. In a further method step, shown in FIG. 2, the blow mold halves 3 close against the tool separator 9 arranged therebetween, pinching off and/or severing the preforms 7 at the extrusion die head 2, possibly with the aid of further tools for separating the continuously extruded preform 7. This closing movement of the blow mold halves 3 is superimposed by a movement of the basic machine frame away under the extrusion die head, as outlined in FIG. 2. The cavity or the mold cavity of the blow molding tool 1 is closed, and the tool separator 9 thereby absorbs the closing forces of the blow mold halves 3 and simultaneously seals the cavity of the blow molding tool 1. The preforms 7 are then placed into the part-cavities 5 of the blow mold halves 3 using a vacuum and/or excess pressure and molded, as shown in FIG. 3. The blow mold halves are opened and moved with respect to the machine frame 8 to the left in the plan view, as shown in FIG. 4. In this respect, it is not important whether the machine frame 8 is movable in relation to the basic machine frame and in relation to the blow mold halves 3, or whether the blow mold halves 3 and the platens 4 are movable in relation to the machine frame 8. This is elective and depends on the space available for positioning the blow molding tool 1 and the extrusion die head 2.

In a further method step (FIG. 5), the component carrier 10 is placed between the blow mold halves 3. The blow mold halves 3 are then closed again. It is not necessary to completely close the blow mold halves 3 during this process in order to obtain a seal. The step of closing the blow mold halves 3 against the component carrier 10 is therefore only optional.

In a further method step, the component holders 12 within the component carrier 10, which were equipped with internal components 13 at the start of the working cycle, are moved in the direction of the shells 14 formed in the part-cavities 5. The internal components 13 are joined to the shells 14 or fastened thereto using force from the stroke movement of the component holders 12.

In the drawings, this process is only shown in relation to one shell 14, but the invention is to be understood as meaning that internal components 13 can be fastened to both shells 14.

By way of example, such fastening can be effected by riveting in the manner described, for example, in German patent application DE 10 2006 006 469 A1, this document hereby being fully incorporated by reference, also for the purpose of disclosure.

Finally, the component holders 12 are moved back into their initial position (FIG. 6), and the blow molding tool 1 is opened, i.e. the blow mold halves 3 are moved apart (FIG. 8). The platens 4 are moved into the initial position, shown in FIG. 9b, between the tool separator 9 and the component carrier 10, and then the blow mold halves perform a closing movement, during which the shells 14 arranged therein are fused together at the edges (FIG. 10). At the same time, the tool separator 9 is already placed between the preforms 7 (further cycle). At the same time, the component holders 12 are equipped with internal components 13.

Finally, the blow mold halves 3 are opened (FIG. 11b) and the finished article provided with internal components 13, in the form of a fuel tank 15, is removed upward from the open tool (FIG. 11b, FIG. 1a).

LIST OF REFERENCE SYMBOLS

1 Blow molding tool
2 Extrusion die head
3 Blow mold halves
4 Platens
5 Part-cavities
6 Slot dies
7 Preforms
8 Machine frame 9 Tool separator
10 Component carrier
11 Sealing surfaces
12 Component holders
13 Internal components
14 Shells
15 Fuel tank (article)

What is claimed is:

1. A molding device, comprising:
a multi-part blow molding tool having at least two mold halves, wherein the at least two mold halves form a cavity to form two complementary shells; and having at least one tool separator moveable transversely to an opening and closing movement of the mold halves, wherein the tool separator is in a form of a central frame or a central plate arranged to seal the cavity of the blow molding tool when closing forces of the mold halves are applied against the tool separator; and having at least one component carrier moveable transversely to the opening and closing movement of the mold halves, wherein the component carrier is adapted to carry at least one component installable on an inner surface of at least one of the shells, and wherein the component carrier is not contained within the tool separator;
wherein the component carrier and the tool separator are arranged on a common machine frame;
wherein the component carrier and the tool separator are arranged on the machine frame at a distance from one another;
wherein each mold half is fastened to one of two platens, each platen having a width; and
wherein the distance between the component carrier and the tool separator is greater than or equal to the width of each platen.

2. The device according to claim 1, wherein:
the machine frame and the blow mold halves are moveable in relation to one another.

3. The device according to claim 1, wherein:
the component carrier and the tool separator are arranged on the machine frame such that the component carrier and the tool separator are moveable in relation to one another.

4. The device according to claim 3, wherein:
each mold half is fastened to one of two platens;
each platen has a width; and
the component carrier and the tool separator are moveable in relation to one another along a movement path; and
a length of the movement path is greater than or equal to the width of each platen.

5. The device according to claim 1, wherein:
the component carrier has a component carrier depth;
the tool separator has a tool separator depth; and
the tool separator depth is less than or equal to the component carrier depth.

6. A molding device, comprising:
a multi-part blow molding tool having at least two mold halves, wherein the at least two mold halves form a cavity to form two complementary shells; and having at least one tool separator moveable transversely to an opening and closing movement of the mold halves, wherein the tool separator is in a form of a central frame or a central plate arranged to seal the cavity of the blow molding tool when closing forces of the mold halves are applied against the tool separator; and having at least one component carrier moveable transversely to the opening and closing movement of the mold halves, wherein the component carrier is adapted to carry at least one component installable on an inner surface of at least one of the shells, and wherein the component carrier is not contained within the tool separator;
wherein the component carrier and the tool separator are arranged on a common machine frame;
wherein the component carrier and the tool separator are arranged on the machine frame such that the component carrier and the tool separator are moveable in relation to one another;
wherein each mold half is fastened to one of two platens, each platen having a width;
wherein the component carrier and the tool separator are moveable in relation to one another along a movement path; and
wherein a length of the movement path is greater than or equal to the width of each platen.

7. The device according to claim 6, wherein:
the machine frame and the blow mold halves are moveable in relation to one another.

8. The device according to claim 6, wherein:
the component carrier and the tool separator are arranged on the machine frame at a distance from one another.

9. The device according to claim 8 wherein:
each mold half is fastened to one of two platens;
each platen has a width; and
the distance between the component carrier and the tool separator is greater than or equal to the width of each platen.

10. A molding device, comprising:
a multi-part blow molding tool having at least two mold halves, wherein the at least two mold halves form a cavity to form two complementary shells; and having at least one tool separator moveable transversely to an opening and closing movement of the mold halves, wherein the tool separator is in a form of a central frame or a central plate arranged to seal the cavity of the blow molding tool when closing forces of the mold halves are applied against the tool separator; and having at least one component carrier moveable transversely to the opening and closing movement of the mold halves, wherein the component carrier is adapted to carry at least one component installable on an inner surface of at least one of the shells, and wherein the component carrier is not contained within the tool separator;
wherein the component carrier has a component carrier depth;
wherein the tool separator has a tool separator depth; and
wherein the tool separator depth is less than or equal to the component carrier depth.

11. The device according to claim 10, wherein:
the component carrier and the tool separator are arranged on a common machine frame.

12. The device according to claim 11, wherein:
the machine frame and the blow mold halves are moveable in relation to one another.

13. The device according to claim 11, wherein:
the component carrier and the tool separator are arranged on the machine frame at a distance from one another.

14. The device according to claim 13, wherein:
each mold half is fastened to one of two platens;
each platen has a width; and
the distance between the component carrier and the tool separator is greater than or equal to the width of each platen.

15. The device according to claim 11, wherein:
the component carrier and the tool separator are arranged on the machine frame such that the component carrier and the tool separator are moveable in relation to one another.

16. The device according to claim 15, wherein:
each mold half is fastened to one of two platens;
each platen has a width; and
the component carrier and the tool separator are moveable in relation to one another along a movement path; and
a length of the movement path is greater than or equal to the width of each platen.

* * * * *